(12) United States Patent
Iwase

(10) Patent No.: US 10,348,049 B2
(45) Date of Patent: Jul. 9, 2019

(54) LIGHT SOURCE DEVICE AND INFORMATION ACQUISITION APPARATUS

(71) Applicant: CANON KABUSHIKI KAISHA, Tokyo (JP)

(72) Inventor: Hideo Iwase, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 297 days.

(21) Appl. No.: 15/367,942

(22) Filed: Dec. 2, 2016

(65) Prior Publication Data
US 2017/0170620 A1 Jun. 15, 2017

(30) Foreign Application Priority Data

Dec. 9, 2015 (JP) .................................. 2015-240266

(51) Int. Cl.
*H01S 3/067* (2006.01)
*G01J 1/04* (2006.01)
(Continued)

(52) U.S. Cl.
CPC ........ *H01S 3/06725* (2013.01); *H01S 3/1118* (2013.01); *H01S 3/0057* (2013.01);
(Continued)

(58) Field of Classification Search
CPC .... H01S 3/1118; H01S 3/1115; H01S 3/0057; H01S 3/005; H01S 3/0085; H01S 3/0092;
(Continued)

(56) References Cited

U.S. PATENT DOCUMENTS 6,778,565 B2 * 8/2004 Spuehler ............... H01S 3/1118
372/11
2003/0058904 A1 * 3/2003 Krainer ................... H01S 3/113
372/25
(Continued)

OTHER PUBLICATIONS

Govind Agrawal, "Nonlinear Fiber Optics", Fifth Edition, Academic Press (2012), Chapters 3 to 5, pp. 57-187. (No month).
(Continued)

*Primary Examiner* — John R Lee
(74) *Attorney, Agent, or Firm* — Venable LLP

(57) ABSTRACT

Provided is a light source device including a fiber laser, an amplifier, and a nonlinear fiber. Group delay dispersions D1 and D2 are a positive value, the light velocity in a vacuum is denoted as c, a spectral full width at half maximum of the pulse light is denoted as $\Delta\lambda$, the center wavelength of the pulse light is denoted as $\lambda$, a coefficient based on a shape of the pulse light is denoted as a, a value of the spectral full width at half maximum $\Delta\lambda$ at which a function $T(\Delta\lambda)$:

$$T(\Delta\lambda) = \left(\frac{a \times \lambda^2}{c \times \Delta\lambda}\right)\sqrt{1 + \left[(D1 + D2)\left(\frac{c \times \Delta\lambda}{a \times \lambda^2}\right)^2\right]^2}$$

is the minimum is denoted as $\Delta\lambda\_min$, and $\Delta\lambda$ at which a change amount of $T(\Delta\lambda)$ when $\Delta\lambda$ increases by 1 nm of $\lambda$ becomes $-3$ dB is denoted as $\Delta\lambda\_3$ dB, and $\Delta\lambda$ satisfies $\Delta\lambda\_3$ dB$\leq\Delta\lambda\leq\Delta\lambda\_min\times 2$.

16 Claims, 12 Drawing Sheets

(51) Int. Cl.
*H01S 3/094* (2006.01)
*H01S 3/11* (2006.01)
*H01S 3/08* (2006.01)
*H01S 3/16* (2006.01)
*H01S 3/00* (2006.01)

(52) U.S. Cl.
CPC ......... *H01S 3/0092* (2013.01); *H01S 3/06754* (2013.01); *H01S 3/06791* (2013.01); *H01S 3/08027* (2013.01); *H01S 3/1618* (2013.01)

(58) Field of Classification Search
CPC ............ H01S 3/06725; H01S 3/06754; H01S 3/06791; H01S 3/08027; H01S 3/1618
See application file for complete search history.

(56) References Cited

U.S. PATENT DOCUMENTS

| | | | |
|---|---|---|---|
| 2003/0118060 A1* | 6/2003 | Spuehler | H01S 3/1118 372/18 |
| 2003/0231826 A1* | 12/2003 | Boyd | G02B 6/12004 385/27 |
| 2005/0226575 A1* | 10/2005 | Brown | G02B 6/02028 385/122 |
| 2009/0034562 A1 | 2/2009 | Nicholson et al. | |
| 2009/0213877 A1* | 8/2009 | Tunnermann | H01S 3/067 372/6 |
| 2010/0328761 A1* | 12/2010 | Reid | G02F 1/39 359/330 |
| 2011/0069723 A1* | 3/2011 | Dong | H01S 3/06716 372/6 |
| 2011/0122407 A1* | 5/2011 | Jalali | G01N 21/65 356/301 |
| 2012/0263197 A1* | 10/2012 | Koplow | G02B 6/274 372/6 |
| 2012/0305968 A1 | 12/2012 | Iwase | |
| 2013/0259071 A1 | 10/2013 | Blais-Ouellette | |
| 2014/0233089 A1* | 8/2014 | Fermann | H01S 3/0057 359/328 |
| 2014/0247448 A1* | 9/2014 | Wise | G01N 21/65 356/301 |
| 2014/0328365 A1* | 11/2014 | Grujic | H01S 3/091 372/70 |
| 2015/0042989 A1* | 2/2015 | Inoue | G01J 3/44 356/301 |
| 2015/0236474 A1* | 8/2015 | Kono | H01S 5/0085 372/33 |
| 2015/0276609 A1* | 10/2015 | Inoue | G01N 21/65 356/301 |
| 2015/0303644 A1* | 10/2015 | Clowes | H01S 3/11 372/6 |
| 2015/0354940 A1* | 12/2015 | Inoue | G01B 9/02091 356/301 |
| 2015/0357786 A1* | 12/2015 | Inoue | H01S 3/06754 250/221 |
| 2016/0204565 A1* | 7/2016 | Barre | H01S 3/108 372/6 |
| 2017/0170620 A1* | 6/2017 | Iwase | H01S 3/06725 |
| 2018/0209905 A1* | 7/2018 | Iketaki | G01N 21/636 |
| 2018/0233877 A1* | 8/2018 | Udem | G01J 3/10 |
| 2018/0278006 A1* | 9/2018 | Moskalev | H01S 3/0619 |
| 2018/0334399 A1* | 11/2018 | Fahs, II | C02F 1/30 |

OTHER PUBLICATIONS

Haohua Tu, et al., "Optical frequency up-conversion by supercontinuum-free widely-tunable fiber-optic Cherenkov radiation", Optics Express, vol. 17, No. 12, pp. 1-20 (Jun. 8, 2009).

* cited by examiner

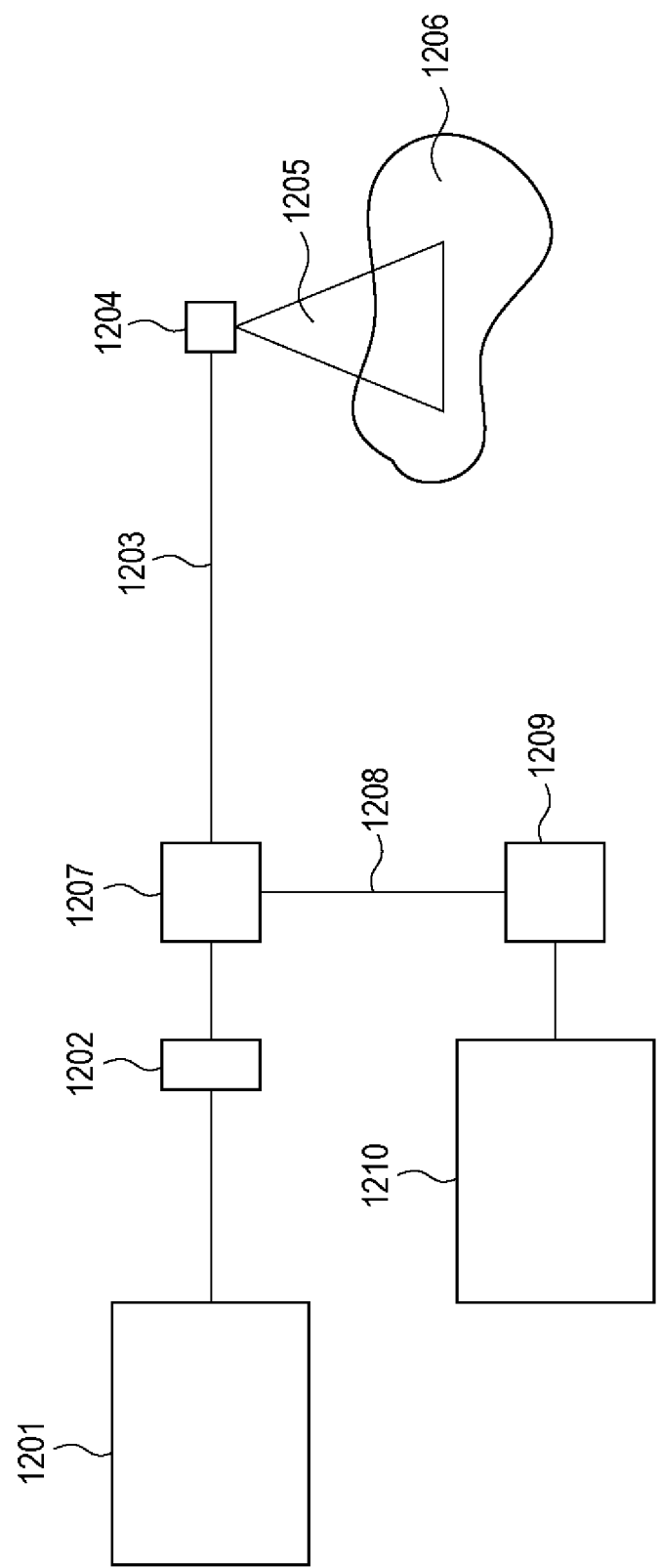

LIGHT SOURCE DEVICE AND INFORMATION ACQUISITION APPARATUS

BACKGROUND OF THE INVENTION

Field of the Invention

The present invention relates to a light source device such as a broadband light source and to an information acquisition apparatus having the same.

Description of the Related Art

In recent years, as a coherent broadband light source (light source device) for a medical imaging apparatus, broadband light sources that utilize a nonlinear wavelength conversion technology by using a highly nonlinear optical fiber have been actively studied. A medical imaging apparatus in which such a broadband light source is used may be a spectrally encoded endoscopy, for example. In addition, an optical coherent tomography is an example thereof.

When high-intensity light propagates in a highly nonlinear optical fiber, a nonlinear optical effect of the highly nonlinear optical fiber causes the propagating light to be converted into a super continuum light (hereafter, referred to as SC light) that is a broadband light having a wide wavelength band. As a highly nonlinear optical fiber used for such wavelength conversion, a photonic crystal fiber having periodical micro-machined features provided in a core and cladding of the optical fiber may be used. Periodical micro-machined features are provided in a core and cladding of a photonic crystal fiber. With this structure, an intense light can be confined in the core of the photonic crystal fiber, and a high optical density that is necessary for effective wavelength conversion can be obtained in the core.

Further, the dispersion of the photonic crystal fiber can be controlled by changing the shape of micro-machined features of a photonic crystal fiber. In general, in order to efficiently generate an SC light, it is desirable that the wavelength of an incident light to a highly nonlinear optical fiber be a wavelength that is close to the zero dispersion wavelength of the highly nonlinear fiber and has an anomalous dispersion. An adjustment of the dispersion is easier in a photonic crystal fiber with periodical micro-machined features than in a photonic crystal fiber without periodical micro-machined features. Therefore, an SC light can be effectively generated by taking the wavelength of an incident light into consideration and selecting a photonic crystal fiber having appropriate structure.

As an incident light to a photonic crystal fiber, a mode-locked pulse light having a pulse width of 100 ps or less may be used. A use of a pulse light having a pulse width of 100 ps or less makes it easier to obtain a light having a high peak intensity required in generating a nonlinear optical effect. Further, a use of a mode-locked pulse light allows for a broader band of the wavelength of a light propagating with various nonlinear optical effects. A nonlinear optical effect which contributes to broaden a band may be self-phase modulation, soliton fission, soliton self-frequency shift, non-solitonic radiation, and pulse trapping, for example.

Note that mechanisms of an SC light generation caused by a pulse light propagating in a photonic crystal fiber are disclosed by Govind Agrawal, "Nonlinear Fiber Optics", Fifth Edition, Academic Press (2012), Samudra Poy et al., "Dispersive wave generation in supercontinuum process inside nonlinear microstructured fibre", Current Science, Vol. 100, No. 3, pp. 321-342 (2011), and Haohua Tu et al., "Optical frequency up-conversion by supercontinuum-free widely-tunable fiber-optic Cherenkov radiation", Optics Express, Vol. 17, No. 12, pp. 9858-9872 (2009). Further, a resonator-type broadband light source that generates an SC light is disclosed in U. S. Patent Application Publication No. 2013/0259071.

Some light source devices that generate an SC light have dispersion compensation optics. In such a light source device, however, the presence of dispersion compensation optics may cause problems such as an increase in size of the light source, complicated alignment of components, and instability of the light source due to misalignment.

SUMMARY OF THE INVENTION

The present invention intends to provide a light source device that can generate an SC light without using dispersion compensation optics.

A light source device according to one aspect of the present invention includes a fiber laser including a resonator that generates a pulse light; an amplifier that amplifies the pulse light emitted from the fiber laser and emits the amplified pulse light; and a nonlinear fiber that generates a nonlinear effect when the pulse light amplified by the amplifier passes through the nonlinear fiber. A group delay dispersion of the resonator is denoted as D1, a group delay dispersion between an output terminal of the resonator and an input terminal of the nonlinear fiber is denoted as D2, and each of the group delay dispersion D1 and the group delay dispersion D2 is a positive value, the velocity of light in a vacuum is denoted as c, a spectral full width at half maximum of the pulse light emitted from the fiber laser is denoted as $\Delta\lambda$, the center wavelength of the pulse light emitted from the fiber laser is denoted as $\lambda$, and a coefficient based on a shape of the pulse light is denoted as a, a value of the spectral full width at half maximum $\Delta\lambda$ at which a function $T(\Delta\lambda)$:

$$T(\Delta\lambda) = \left(\frac{a \times \lambda^2}{c \times \Delta\lambda}\right)\sqrt{1 + \left[(D1 + D2)\left(\frac{c \times \Delta\lambda}{a \times \lambda^2}\right)^2\right]^2} \qquad (1)$$

is the minimum is denoted as $\Delta\lambda\_min$, and a value of the spectral full width at half maximum $\Delta\lambda$ at which a change amount of the function $T(\Delta\lambda)$ when the spectral full width at half maximum $\Delta\lambda$ increases by 0.01% of the center wavelength $\lambda$ becomes −3 dB is denoted as $\Delta\lambda\_3$ dB, and the spectral full width at half maximum $\Delta\lambda$ satisfies $\Delta\lambda\_3$ dB$\leq\Delta\lambda\leq\Delta\lambda\_min\times 2$.

Further features of the present invention will become apparent from the following description of exemplary embodiments with reference to the attached drawings.

BRIEF DESCRIPTION OF THE DRAWINGS

FIG. 12 is a configuration diagram of a spectrally encoded endoscope according to a fourth embodiment.

DESCRIPTION OF THE EMBODIMENTS

Preferred embodiments of the present invention will now be described in detail in accordance with the accompanying drawings.

Comparative Example

Prior to the description of a broadband light source according to embodiments of the present invention, a broadband light source according to a comparative example will be described by using FIG. 11.

In some broadband light sources that cause a pulse light to enter a photonic crystal fiber to generate an SC light, an optical fiber doped with ytterbium elements (Yb) (Yb-doped fiber) is used as a gain medium. Such a broadband light source can generate an SC light by causing a pulse light having a wavelength around 1 μm to enter a photonic crystal fiber. Since the wavelength of the incident pulse light (approximately 1 μm) is close to that of visible light, a broadband light source with an Yb-doped fiber is suitable for generation of an SC light including a visible light.

In general, widely used single-mode fibers and multimode fibers have dispersion characteristics similar to dispersion characteristics of a silica glass. Therefore, when a pulse light having a wavelength of around 1 μm propagates in an optical fiber, the pulse width of the propagating pulse light is increased due to a normal dispersion (a dispersion in which a group velocity dispersion is a positive value) of the optical fiber. In order to suppress such an increase of the pulse width, broadband light sources with an Yb-doped fiber often have dispersion compensation optics that compensate a dispersion of an optical fiber to reduce the pulse width. The term of dispersion compensation optics here refers to optics (or one or more optical components) whose group delay dispersion is negative for a light having the wavelength of around 1 μm.

Figure 11:
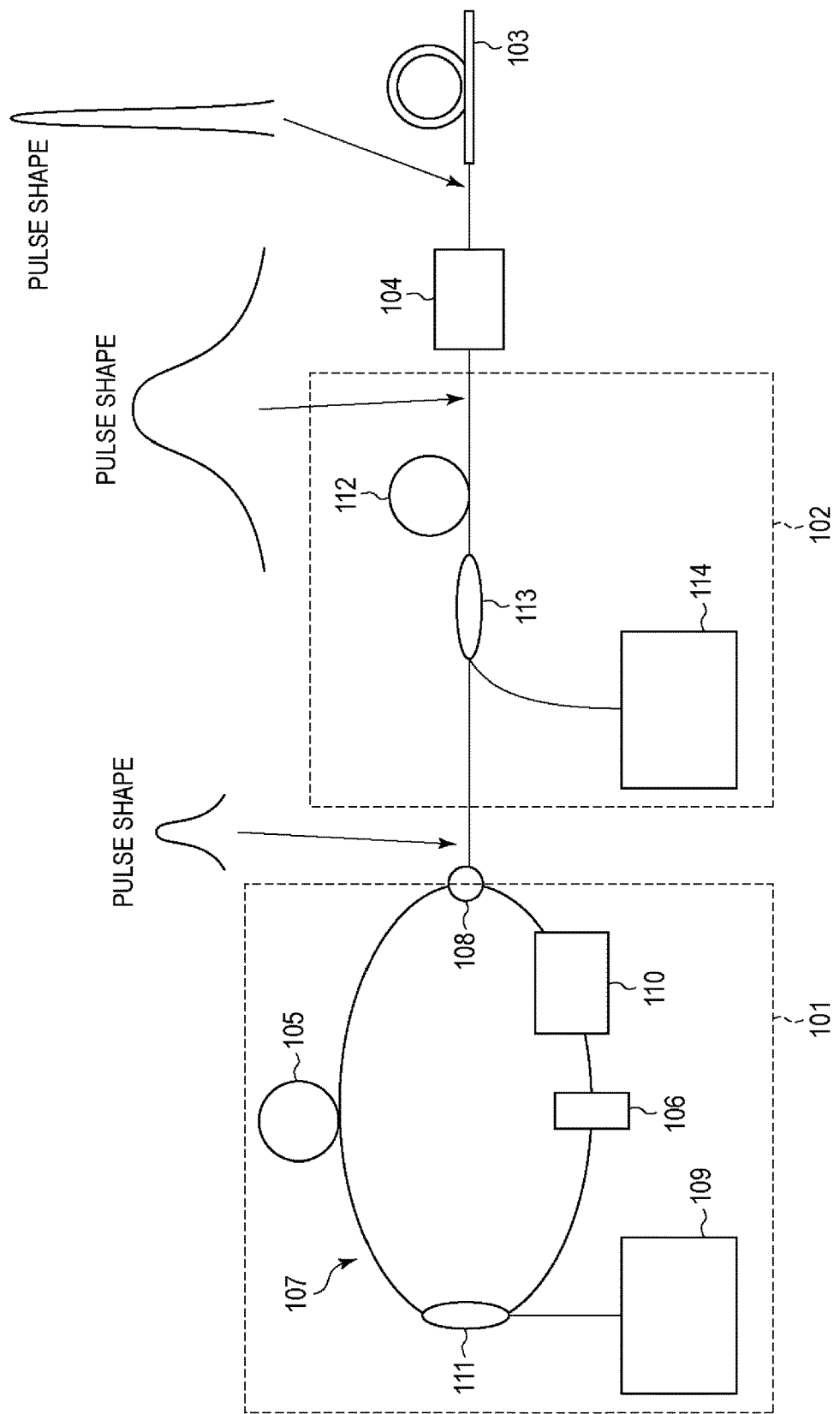
FIG. 11 is a configuration diagram of a broadband light source according to a comparative example.

FIG. 11 is a configuration diagram of a broadband light source according to a comparative example. The broadband light source illustrated in FIG. 11 has a fiber laser 101, an optical fiber amplifier 102, a photonic crystal fiber 103, and dispersion compensation optics 104. The fiber laser 101 and the optical fiber amplifier 102 are connected by an optical fiber. The optical fiber amplifier 102 and the dispersion compensation optics 104 are connected by an optical fiber. The dispersion compensation optics 104 and the photonic crystal fiber 103 are connected by an optical fiber.

The fiber laser 101 has a resonator 107 and a light source 109, and the resonator 107 includes an Yb-doped fiber 105, a saturable absorber 106, an output coupler 108, dispersion compensation optics 110, and an input coupler 111. The input coupler 111 is a coupler having two inputs and one output, and the output coupler 108 is a coupler having one input and two outputs. The light source 109 is connected to the first input terminal of the input coupler 111 and supplies a light having a wavelength of approximately 1 μm to the resonator 107. The output terminal of the input coupler 111 is connected to one terminal of the Yb-doped fiber 105. The other terminal of the Yb-doped fiber 105 is connected to the input terminal of the output coupler 108. The first output terminal of the output coupler 108 forms an output terminal of the fiber laser 101 and is connected to an input terminal of the optical fiber amplifier 102. The second output terminal of the output coupler 108 is connected to an input terminal of the dispersion compensation optics 110. An output terminal of the dispersion compensation optics 110 is connected to an input terminal of the saturable absorber 106, and an output terminal of the saturable absorber 106 is connected to the second input terminal of the input coupler 111.

The Yb-doped fiber 105 is a gain medium of the fiber laser 101. The saturable absorber 106 is an optical component designed such that the absorption loss is lower for a light having higher peak power and the absorption loss is higher for a light having lower peak power. The group delay dispersion of the dispersion compensation optics 110 is designed such that a sum of group delay dispersions becomes negative or around zero after a light having a wavelength of approximately 1 μm has circulated completely through the resonator. That is, a group delay dispersion D1, which is a sum of group delay dispersions of optical components except the dispersion compensation optics 110, is a positive value, and a group delay dispersion of the dispersion compensation optics 110 is a negative value whose absolute value is substantially the same as the group delay dispersion D1. Therefore, when a pulse light circulates through the resonator 107, an increase of the pulse width is compensated by the dispersion compensation optics 110. As a result, a pulse light circulating through the resonator 107 is able to pass through the saturable absorber 106 with a narrow pulse width maintained, which reduces the loss of a pulse light propagating in the resonator 107 at the saturable absorber 106. Therefore, a light propagating in the resonator 107 will be a pulse light having a narrow pulse width. A state where a pulse light is in a stable oscillation is referred to as mode-locked, and a pulse light generated in a mode-locked state is referred to as a mode-locked pulse light.

A pulse light output from the fiber laser 101 is input to the optical fiber amplifier 102 and amplified therein. The optical fiber amplifier 102 includes an Yb-doped fiber 112, a two-input one-output coupler 113, and a light source 114. The Yb-doped fiber 112 is a gain medium of the optical fiber amplifier 102. The output terminal of the fiber laser 101 and an output terminal of the light source 114 are connected to the two input terminals of the coupler 113. The output terminal of the coupler 113 is connected to one terminal of the Yb-doped fiber 112, and the other terminal of the Yb-doped fiber 112 is connected to an input terminal of the dispersion compensation optics 104. According to this configuration, a pulse light amplified by the optical fiber amplifier 102 is input to one terminal of the photonic crystal fiber 103 via the dispersion compensation optics 104.

The other terminal of the photonic crystal fiber 103 is an output terminal of the broadband light source that emits an SC light. The photonic crystal fiber 103 exhibits an anomalous dispersion (that is, a dispersion whose group velocity dispersion is a negative value) for a light having a wavelength of around 1 μm.

A pulse light that has been amplified by the optical fiber amplifier 102 and reached the dispersion compensation optics 104 has an increased pulse width due to a group delay dispersion D2 between the output terminal of the resonator 107 (that is, the first output terminal of the output coupler 108) and the input terminal of the dispersion compensation optics 104. The dispersion compensation optics 104 are designed so as to compensate the group delay dispersion D2. That is, the group delay dispersion of the dispersion compensation optics 104 is a negative value whose absolute value is substantially the same as the group delay dispersion D2. The pulse width of a pulse light that has passed through the dispersion compensation optics 104 is reduced by such compensation of the group delay dispersion D2. In such a way, a conventional broadband light source with the dispersion compensation optics 104 and 110 can suppress an increase of the pulse width due to dispersions of optical fibers or the like. As a result, a pulse light having a pulse width of 500 fs or less and having a high peak intensity is allowed to enter the photonic crystal fiber. Note that the dispersion compensation optics 104 and 110 may be a pair of prisms, a pair of gratings, a chirp fiber Bragg grating, a holey core fiber, or the like, for example.

The higher the peak intensity of an incident pulse light to the photonic crystal fiber 103 is, the broader the band of the spectrum of an SC light emitted from the photonic crystal fiber 103 will be. Therefore, generation of an SC light having a broadband spectrum can be generated by causing a pulse light having a high peak intensity obtained by using the dispersion compensation optics 104 and 110 to enter the photonic crystal fiber 103.

In such a broadband light source, however, the presence of the dispersion compensation optics 104 and 110 may cause problems such as an increase in size of the light source, complicated alignment of components, and instability of the light source due to misalignment. In contrast, in the following embodiments, exemplary configurations of a preferable broadband light source that can generate an SC light without using dispersion compensation optics will be described.

First Embodiment

Figure 1:
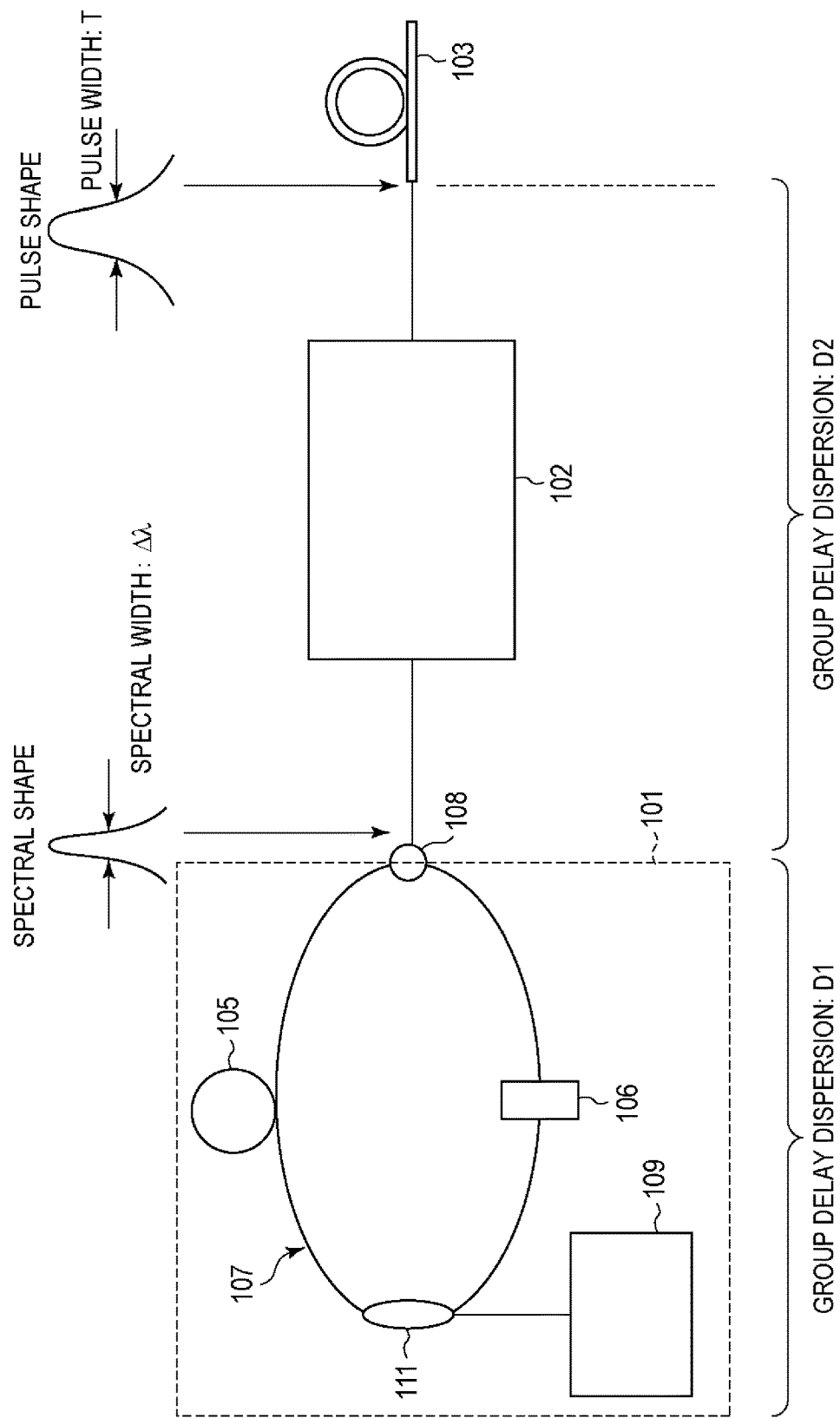
FIG. 1 is a configuration diagram of a broadband light source according to a first embodiment.

A broadband light source according to the first embodiment will be described below with reference to FIG. 1 to FIG. 3. FIG. 1 is a configuration diagram of the broadband light source according to the first embodiment. For details duplicated with the comparative example described above, the description thereof may be simplified or omitted.

The broadband light source has a fiber laser 101, an optical fiber amplifier 102, and a photonic crystal fiber 103. This embodiment is different from the above-described comparative example in that no dispersion compensation optics 104 is provided between the optical fiber amplifier 102 and the photonic crystal fiber 103. Note that the photonic crystal fiber described in each embodiment is an example and not limited thereto. The photonic crystal fiber may be replaced with any nonlinear fiber that can generate a nonlinear effect.

The fiber laser 101 has a resonator 107 that generates a mode-locked pulse light and a light source 109, and the resonator 107 includes an Yb-doped fiber 105, a saturable absorber 106, an output coupler 108, and an input coupler 111. This embodiment is different from the above-described comparative example in that no dispersion compensation optics 110 is provided between the output coupler 108 and the saturable absorber 106.

An excitation light output from the light source 109 enters the Yb-doped fiber 105 via the input coupler 111 and propagates in the Yb-doped fiber 105. At this time, the Yb-doped fiber 105 is excited by the excitation light. The excited Yb-doped fiber 105 emits a light having a wavelength between 1000 to 1100 nm. A part of the light emitted from the Yb-doped fiber 105 resonates within the resonator 107. The saturable absorber 106 included in the resonator 107 has a low absorption rate for a pulse light. In other words, since the saturable absorber 106 selectively transmits a pulse light, a light resonating in the resonator 107 will be a pulse light. The group delay dispersion D1 of the resonator 107 with respect to the center wavelength $\lambda$ of this pulse light is a positive value. Here, the group delay dispersion D1 of the resonator 107 is a group delay dispersion that the mode-locked pulse light receives while circulating completely through the resonator 107. The group delay dispersion D1 is equal to a sum of group delay dispersions of optical components that the pulse light transmits while circulating completely through in the resonator 107. Further, a group delay dispersion of an optical fiber is equal to a product of the group velocity dispersion of the optical fiber by the length of the optical fiber. A part of the pulse light resonating in the resonator 107 is extracted from the resonator 107 via the output coupler 108 as an output of the fiber laser 101.

The fiber laser 101, the optical fiber amplifier 102, and the photonic crystal fiber 103 are optically connected. The mode-locked pulse light output from the fiber laser 101 is amplified in power by the optical fiber amplifier 102 and then enters the input terminal of the photonic crystal fiber 103. The photonic crystal fiber 103 generates an SC light by a nonlinear effect when an incident mode-locked pulse light passes therein. The generated SC light is emitted from the output terminal of the photonic crystal fiber 103.

The group delay dispersion D2 between the output terminal of the resonator 107 (that is, the output terminal of the output coupler 108) and the input terminal of the photonic crystal fiber 103 is a positive value. In other words, the group delay dispersion D2 is a group delay dispersion that a pulse light output from the fiber laser 101 receives until reaching the input terminal of the photonic crystal fiber 103. Therefore, the group delay dispersion D2 is a sum of the group delay dispersions of optical components connecting the fiber laser 101 to the optical fiber amplifier 102, the optical fiber amplifier 102, and the optical components connecting the optical fiber amplifier 102 to the photonic crystal fiber 103. When any of these optical components is an optical fiber, the group delay dispersion thereof is equal to a value of a product of the group velocity dispersion of the optical fiber by the length of the optical fiber.

A pulse light that is output from the fiber laser 101 and reaches the input terminal of the photonic crystal fiber 103 is influenced by the group delay dispersions D1 and D2, and thus the pulse width thereof is increased. A full width at half maximum $T_0$ of a Fourier-limited pulse of a pulse light having a spectral full width at half maximum $\Delta\lambda$ (hereafter, referred to as spectral width $\Delta\lambda$) is obtained by the following equation.

$$T_0 = \frac{a}{\frac{c \times \Delta\lambda}{\lambda^2}} \quad (2)$$

Here, λ is the center wavelength of a pulse light and a is a coefficient based on the shape of the pulse light. Further, c is the velocity of light in a vacuum. Note that the coefficient a of a pulse light may vary in accordance with the shape of the pulse light. For example, when a pulse light has a sech$^2$ shape, the value a is 0.315. When a pulse light has a Gaussian shape, the value a is 0.441. In the following, a pulse light is assumed to be a sech$^2$ shaped pulse as an example, and the description will be provided by using equations in each of which the coefficient a is substituted with 0.315. The pulse full width at half maximum (hereafter, referred to as pulse width) T resulted after the pulse light has passed through optics having the group delay dispersions D1 and D2 is expressed by the following equation.

$$T = T_0\sqrt{1+\left(\frac{D1+D2}{T_0^2}\right)^2} = \left(\frac{0.315\lambda^2}{c \times \Delta\lambda}\right)\sqrt{1+\left[(D1+D2)\left(\frac{c \times \Delta\lambda}{0.315\lambda^2}\right)^2\right]^2} \quad (3)$$

Figure 2:
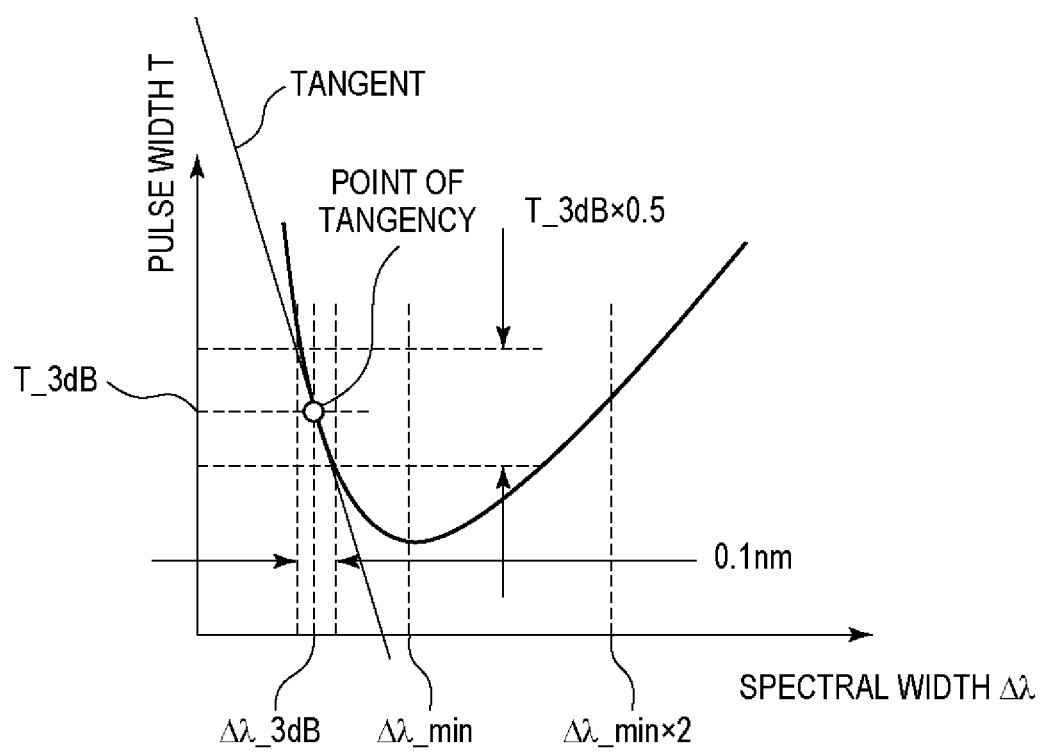
FIG. 2 is a graph illustrating a relationship of a spectral width $\Delta\lambda$ and a pulse width T.

FIG. 2 is a graph in which the pulse width T is plotted as a function T(Δλ) of the spectral width Δλ when D1+D2 is not equal to zero in Equation (3). As illustrated in FIG. 2, the function T(Δλ) that determines the pulse width T becomes a local minimum and the minimum when the spectral width Δλ is equal to Δλ_min. According to FIG. 2, selection of the spectral width Δλ of the pulse light output from the fiber laser 101 allows for a desirable value of the pulse width T of an incident pulse light to the photonic crystal fiber 103. In general, in order to generate a broadband SC light, it is desirable that the spectral width Δλ of a pulse light output from the fiber laser 101 be a value close to the spectral width Δλ_min at which the spectral width T is a local minimum. In order to generate an SC light having a narrow wavelength bandwidth, however, the spectral width Δλ may be a value distant from Δλ_min.

In the fiber laser 101, when the group delay dispersion D1 of the resonator 107 is a positive value, an increasing rate of the pulse width T when the pulse light circulates completely through the resonator 107 (equal to a pulse width $T_1$ after a circulation divided by the full width at half maximum $T_0$ of a Fourier-limited pulse before the circulation) is expressed by the following equation.

$$\frac{T_1}{T_0} = \sqrt{1+\left[D1\left(\frac{c \times \Delta\lambda}{0.315\lambda^2}\right)^2\right]^2} \quad (4)$$

The electromagnetic wave of the pulse light after one cycle in the resonator 107 is subjected to phase modulation due to a dispersion. The phase rotation angle $\phi_d$ thereof is expressed by the following equation.

$$\phi_d = -\frac{\text{sgn}(\beta_2)(D1/T_0^2)}{1+(D1/T_0^2)^2}\frac{1}{2}\frac{T_1^2}{T_0^2}+\frac{1}{2}\tan^{-1}\left(\frac{D1}{T_0^2}\right) \quad (5)$$

$$= -\frac{1}{2}D1\left(\frac{c \times \Delta\lambda}{0.315\lambda^2}\right)^2+\frac{1}{2}\tan^{-1}\left(D1\left(\frac{c \times \Delta\lambda}{0.315\lambda^2}\right)^2\right)$$

Here, $\beta_2$ is an average value of group velocity dispersions of fibers and optical components of the resonator 107. The average value $\beta_2$ is substantially the same as a value resulted by dividing the group delay dispersion D1 of the resonator 107 by the length L of the resonator 107 and is a positive value.

Figure 3:
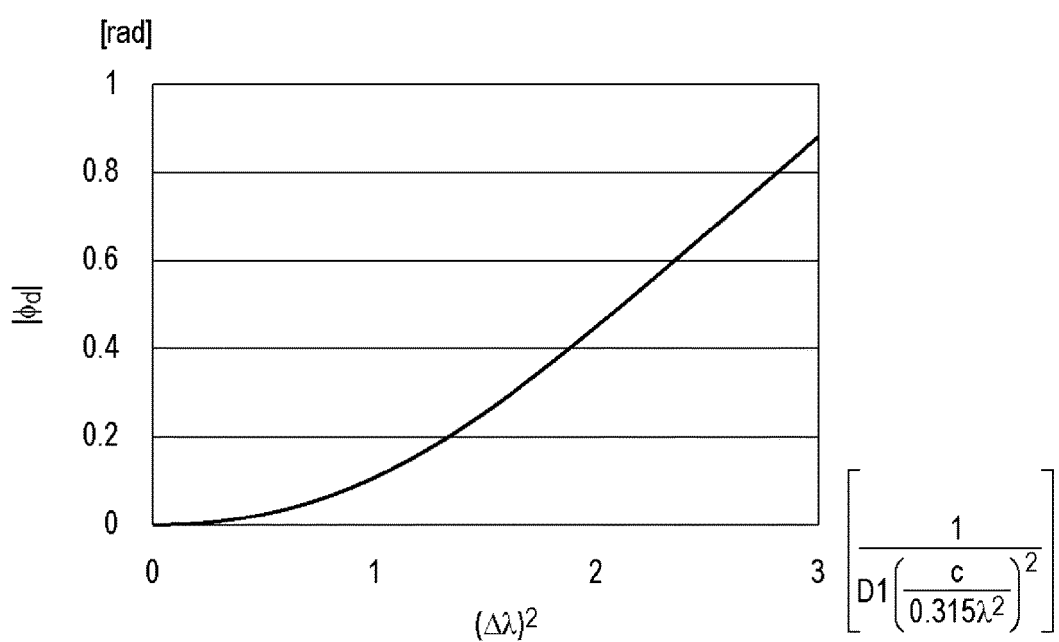
FIG. 3 is a graph illustrating a relationship of a spectral width $\Delta\lambda$ and a phase rotation angle $|\phi_d|$ due to a dispersion.

FIG. 3 is a graph in which the absolute values of the phase rotation angle $\phi_d$ are plotted with respect to (Δλ)$^2$. Note that values of (Δλ)$^2$ in the horizontal axis are normalized with 1/(D1(c/0.315λ$^2$)$^2$). As seen in FIG. 3, a larger Δλ results in a larger absolute value of the phase rotation angle $\phi_d$. Further, the pulse light is subjected to phase modulation due to self-phase modulation (hereafter, referred to as SPM) that is a nonlinear optical effect of the optical fiber of the resonator 107. This effect causes a pulse light having the phase rotation angle $\phi_d$ to be mode-locked in the resonator 107 whose group delay dispersion D1 is a positive value. In such a way, the pulse light that is subjected to a phase modulation effect due to self-phase modulation and thus is mode-locked is referred to as a similariton pulse. The intensity of self-phase modulation (that is, the phase rotation angle $\phi_{SPM}$ due to self-phase modulation) is expressed by the following equation.

$$\phi_{SPM}=\gamma P_{peak}L \quad (6)$$

Here, γ is an average value of nonlinear coefficients of the optical fibers of the resonator 107, and $P_{peak}$ is an average value of the peak power of a pulse light propagating in the resonator 107. When the phase rotation angle $\phi_d$ due to a dispersion is large, the phase rotation angle $\phi_{SPM}$ due to self-phase modulation that compensates the large rotation angle $\phi_d$ also needs to be large. As represented by Equation (6), an increase in the peak intensity of a pulse light allows for an increase in the phase rotation angle $\phi_{SPM}$ due to self-phase modulation. However, excessively increased power of the pulse light propagating in the resonator 107 may cause instability of the fiber laser 101 due to heat. Further, damage of a component inside the resonator 107, in particular, the saturable absorber 106 may be caused. On the other hand, when the phase rotation angle $\phi_d$ due to a dispersion is small, phase modulation due to a dispersion can be compensated even when the phase rotation angle $\phi_{SPM}$ due to self-phase modulation is small. That is, since the phase rotation angle $\phi_d$ due to a dispersion decreases when the spectral width Δλ is small, a similariton pulse may be generated even when the pulse light power is reduced. Thereby, mode-locking of the fiber laser 101 is stabilized and damage of the components inside the resonator 107 is less likely to occur.

Here, the spectral width Δλ of the pulse light can be controlled by providing an optical filter having a desired spectral bandwidth that utilizes multiple interference by using a dielectric multilayer, a fiber Bragg grating, or the like within the resonator 107.

Experiments have shown that the phase rotation angle $\phi_{SPM}$ due to self-phase modulation when the pulse width T is a local minimum is substantially the same as or slightly larger than a phase rotation angle caused by a group delay when the spectral width is twice as large as Δλ_min. While a spectral width that is larger than Δλ_min results in a larger pulse width T and smaller peak power, when a spectral width is less than or equal to twofold Δλ_min, a phase rotation angle is compensated by self-phase modulation even when the pulse energy is the same. It is therefore preferable that the spectral width Δλ be less than or equal to twofold spectral width Δλ_min at which the pulse width T is a local minimum. This can stabilize mode-locking in the fiber laser 101 and reduce the power of a pulse light to a sufficient level so that damage of the component inside the resonator 107 is less likely occur. Further, with the spectral width Δλ being less than or equal to twofold spectral width Δλ_min, the spectral width Δλ can be close to Δλ_min that is effective in broadening the band of an SC light.

Further, it is further preferable that the spectral width Δλ be less than or equal to the spectral width Δλ_min at which the pulse at which the pulse width T is a local minimum. This allows for a further reduction of the power of the pulse light, which can further ensure stabilized mode-locking in the fiber laser 101 and reduced occurrence of damage of the component inside the resonator 107. Further, in a similar manner to the above, the spectral width Δλ can be close to Δλ_min that is effective in broadening the band of an SC light.

Further, as illustrated in FIG. 2, in a region where the spectral width Δλ is less than or equal to Δλ_min, the pulse width T changes sharply with respect to a change in the spectral width Δλ. As described above, the spectral width Δλ of a pulse light is controlled by providing an optical filter having a predetermined spectral bandwidth that utilizes multiple interference by a dielectric multilayer, a fiber Bragg grating, or the like within the resonator 107. The accuracy (variation) of the spectral bandwidth of these optical filters is approximately 0.01%, which corresponds to approximately 0.1 nm for a pulse light having the wavelength of 1000 nm, for example. The variation of the pulse width T caused by the variation of the spectral bandwidth of the optical filter causes the variation of peak power $P^{in}_{peak}$ of an incident pulse light to the photonic crystal fiber 103. Because the peak power of a pulse light is in inversely proportional to the pulse width T of the pulse light, this peak power variation δ $P^{in}_{peak}/P^{in}_{peak}$ is substantially the same level as the variation δT/T of the pulse width T of the pulse light. Such a peak power variation δ $P^{in}_{peak}/P^{in}_{peak}$ can be compensated by adjusting the amplification factor of the optical fiber amplifier 102.

However, an adjustable range of the amplification factor of the optical fiber amplifier 102 is limited. It is desirable to take this adjustable range into consideration to have the peak power variation δ $P^{in}_{peak}/P^{in}_{peak}$ that is substantially equal to or less than the transmission loss of the optical component such as an isolator provided between the fiber laser 101 and the photonic crystal fiber 103. From this point of view, the variation δT/T of the pulse width T is desirably less than or equal to a transmission loss 3 dB (around 50%) that is typically permitted in fiber-coupled optical components.

Therefore, it is desirable that the spectral width Δλ of a pulse light output from the fiber laser 101 be larger than or equal to the spectral width Δλ_3 dB at which the variation δT/T of the pulse width T becomes 3 dB (around 50%) when Δλ is changed by approximately 0.01% with respect to the center wavelength. In other words, it is desirable that the spectral width Δλ be larger than or equal to the spectral width Δλ_3 dB at which the change amount of the pulse width T becomes −3 dB when Δλ is increased by approximately 0.01% with respect to the center wavelength.

FIG. 2 depicts the spectral width Δλ_3 dB at which the change amount of the pulse width T becomes −3 dB when Δλ is increased by approximately 0.01% with respect to the center wavelength. The following equation is established:

$$\frac{dT/d\Delta\lambda[ps/nm] \times 0.1[nm]}{T\_3dB[ps]} \approx -0.5 \quad (7)$$

where the pulse width T at Δλ_3 dB is denoted as T_3 dB and the slope of a tangent at Δλ_3 dB is denoted as dT/dΔλ (ps/nm).

To summarize the above description, it is preferable that the spectral width Δλ of a pulse light output from the fiber laser 101 satisfy a relationship of Δλ_3 dB≤Δλ≤Δλ_min×2. In this case, stabilization of mode-locking in the fiber laser 101 and reduction of damage of the component inside the resonator 107 are realized and the variation of the peak power can be suppressed within a range where the variation of the peak power can be adjusted by the optical fiber amplifier 102. Further, it is further preferable to satisfy Δλ_3 dB≤Δλ≤Δλ_min. This allows for a further reduction of the power of a pulse light, which can further ensure stabilized mode-locking in the fiber laser 101 and reduced damage of the component inside the resonator 107.

As discussed above, according to the present embodiment, a light source device that can generate an SC light without using dispersion compensation optics is provided. This can reduce the problems such as an increase in size of the light source, complicated alignment of components, and instability of the light source due to misalignment that would otherwise be caused by the presence of dispersion compensation optics.

A fundamental configuration of the present invention has been described above as the first embodiment. Examples by which the configuration of the first embodiment is further clarified or in which a part of the configuration is modified will be described below as a second embodiment and a third embodiment. Also in the description of the second embodiment and the third embodiment, for details duplicated with the comparative example or the first embodiment described above, the description thereof may be simplified or omitted.

Second Embodiment

Figure 4:
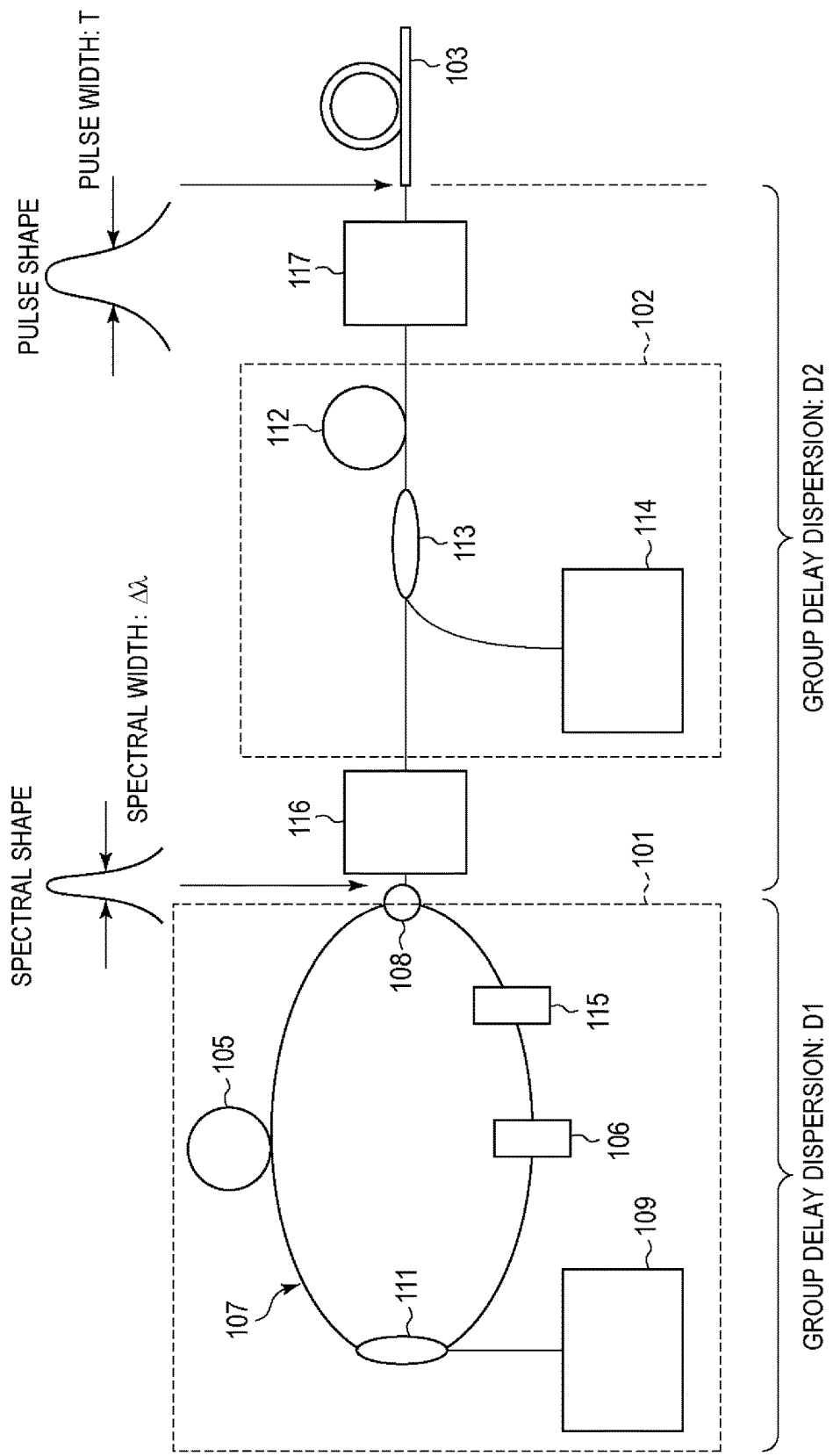
FIG. 4 is a configuration diagram of a broadband light source according to a second embodiment.

FIG. 4 is a configuration diagram of a broadband light source according to the second embodiment. The fiber laser 101 includes the resonator 107 and the light source 109. The resonator 107 includes the saturable absorber 106, the output coupler 108, a bandpass filter 115, the input coupler 111, and the Yb-doped fiber 105. The bandpass filter 115 is an optical filter provided between the output coupler 108 and the saturable absorber 106. The saturable absorber 106 includes one or more of a semiconductor, a carbon nano-tube, and a graphene, for example, as a material, and functions as a transmissive saturable absorber for a light propagating in a resonator. That is, the saturable absorber 106 transmits a pulse light propagating in the resonator 107 at a low loss and provides a high loss to a light that is not a pulse light. The input coupler 111 is a wavelength division multiplexing coupler, for example.

The Yb-doped fiber 105 is a single-mode fiber, for example, and CorActive part No. Yb406 may be used for the Yb-doped fiber 105. The pulse light propagating in the resonator 107 contains a light having any wavelength from 1000 nm to 1100 nm corresponding to the light-emitting wavelength band of an Yb-doped fiber. The output coupler 108 extracts, from the resonator 107, 50% of the power of a pulse light that has propagated in the resonator 107 and reached the output coupler 108 as an output, and returns the remaining 50% of the power to the inside of the resonator 107.

The center wavelength of the transmission spectrum of the bandpass filter 115 substantially matches the center wavelength λ of the pulse light propagating in the resonator 107. The spectral width Δλ of a pulse light can be controlled to be a desired value by using the bandpass filter 115 having a desired spectral bandwidth. As a bandpass filter 115, a bandpass filter formed of a dielectric multilayer may be used, for example. The center wavelength of the bandpass filter 115 may be 1030 nm, for example. The bandwidth of the transmission spectrum of the bandpass filter 115 may be 2.5 nm, for example. In this case, the spectral width $\Delta\lambda$ of the pulse light will be approximately 2.5 nm.

The light source 109 is a laser diode, for example. The light source 109 outputs an excitation light having a wavelength that matches an absorption wavelength of the Yb-doped fiber 105. The wavelength of the excitation light output from the light source 109 may be 980 nm, for example. The excitation light enters the resonator 107 via the input coupler 111. The excitation light entering the resonator 107 excites the Yb-doped fiber 105. The excited Yb-doped fiber 105 provides energy to the pulse light propagating in the resonator 107 by a stimulated emission process. These optical components of the resonator 107 are connected via single-mode fibers that exhibit the single mode for the wavelength $\lambda$ of the pulse light. For example, Corning part No. HI1060 may be used for this single-mode fiber.

The propagation distance where a pulse light circulates completely through the resonator 107, that is, the length of the resonator 107 is 6 m. The fiber laser 101 in the configuration described above outputs a pulse light whose center wavelength $\lambda$ is 1030 nm, spectral width $\Delta\lambda$ is 2.5 nm, repetition frequency f is 30 MHz, and output power is approximately 5 mW. The pulse light output from the fiber laser 101 is mode-locked and the repetition frequency f thereof is substantially inversely proportional to the reciprocal number of the time for the pulse light to circulate completely through the resonator 107. The group delay dispersion of the resonator 107 is a sum of the group delay dispersions of optical components and optical fibers included in the resonator 107. The group delay dispersions of the bandpass filter 115, the saturable absorber 106, the output coupler 108, and the input coupler 111 included in the resonator 107 are much smaller than the group delay dispersions of the Yb-doped fiber 105 and the optical fibers connected between the optical components. Therefore, the group delay dispersion D1 of the resonator 107 is substantially determined by the group delay dispersion of the optical fibers. The average value of the group velocity dispersions of the optical fibers included in the resonator 107 is 0.025 ($ps^2$/m). The group delay dispersion D1 obtained by multiplying this average value by 6 m, which is the length of the resonator 107, is 0.15 ($ps^2$).

The optical fiber amplifier 102 has an Yb-doped fiber 112, a coupler 113, and an optical source 114. The Yb-doped fiber 112 may be a double-cladding fiber, for example, and the length thereof is 3 m. For example, CorActive part No. DCF-Yb-10/128-E may be used for the Yb-doped fiber 112.

The light source 114 may be a laser diode, for example, and outputs an excitation light having a wavelength of 980 nm, which is an absorption wavelength of the Yb-doped fiber 112. The coupler 113 is a wavelength division multiplexing coupler, and two input terminals of the coupler 113 are connected to a fiber which forms an output terminal of the light source 114 and to a fiber which propagates the pulse light output from the fiber laser 101, respectively. The output terminal of the coupler 113 is connected to the Yb-doped fiber 112, and the excitation light is propagated to the Yb-doped fiber 112 via the coupler 113 and excites the Yb-doped fiber 112.

The photonic crystal fiber 103 has an anomalous dispersion at the center wavelength $\lambda$ (equal to 1030 nm) of the pulse light. For example, NKT Photonics part No. SC-3.7-975 whose zero dispersion wavelength is 975 nm may be used for the photonic crystal fiber 103. The length of the photonic crystal fiber 103 can be selected from the range from 1 m to 3 m, for example.

The fiber laser 101 and the optical fiber amplifier 102 are connected by an optical fiber via an isolator 116. The optical fiber amplifier 102 and the photonic crystal fiber 103 are connected by an optical fiber via an isolator 117. The pulse light output from the fiber laser 101 is amplified by the optical fiber amplifier 102 and reaches the input terminal of the photonic crystal fiber 103. The pulse light that has reached the photonic crystal fiber 103 has been amplified in power to approximately 1 W. The length of the fiber from the output terminal of the resonator 107 (that is, the output terminal of the output coupler 108) to the input terminal of the photonic crystal fiber 103 is approximately 4 m, for example.

The group delay dispersion D2 from the output terminal of the fiber laser 101 to the input terminal of the photonic crystal fiber 103 is a sum of the group delay dispersions of optical components and optical fibers connected between the output terminal of the fiber laser 101 and the input terminal of the photonic crystal fiber 103. The group delay dispersions of the isolators 116 and 117 and the coupler 113 that are optical components are much smaller than the group delay dispersions of the Yb-doped fiber 112 and the optical fibers connected between the optical components. Therefore, the group delay dispersion D2 is substantially determined by the group delay dispersion of the optical fibers. The average value of the group velocity dispersions of the optical fibers from the output terminal of the resonator 107 (that is, the output terminal of the output coupler 108) to the input terminal of the photonic crystal fiber 103 is approximately 0.025 ($ps^2$/m). The group delay dispersion D2 obtained by multiplying this average value by approximately 4 m, which is the length of the fibers, is approximately 0.10 ($ps^2$).

Figure 5:
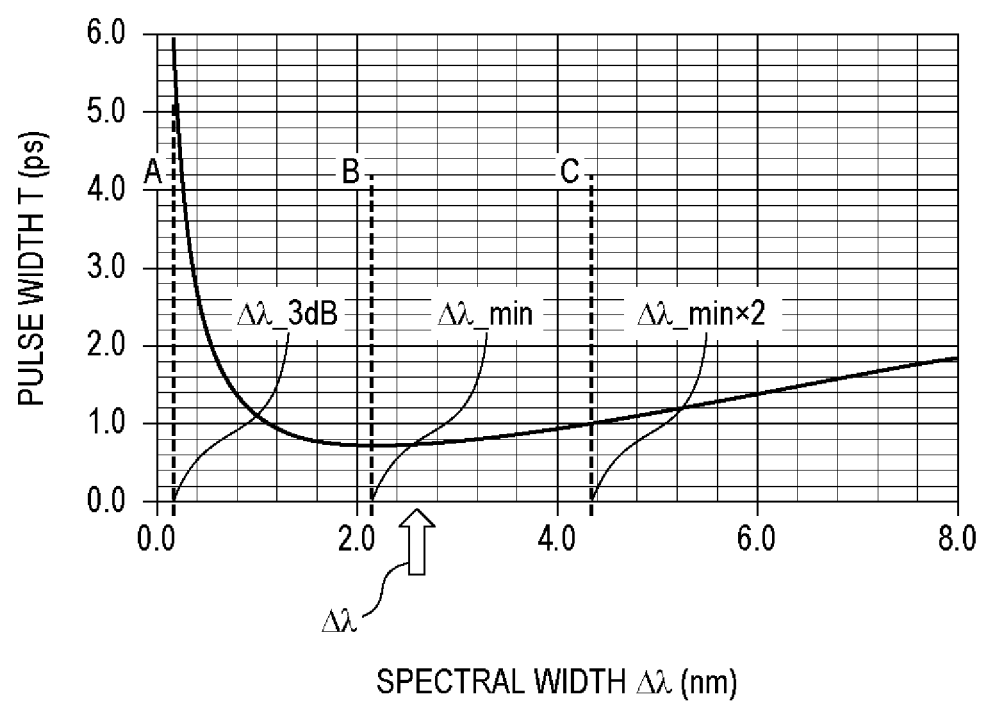
FIG. 5 is a graph illustrating a relationship of a spectral width $\Delta\lambda$ and a pulse width T according to the second embodiment.

FIG. 5 is a graph illustrating a relationship of the pulse width T and the spectral width $\Delta\lambda$. The pulse width T becomes a local minimum and the minimum at a spectral width of 2.2 nm (equal to $\Delta\lambda\_min$). Therefore, with the spectral width $\Delta\lambda$ being less than or equal to 4.4 nm, a spectral width close to the $\Delta\lambda\_min$ at which the pulse width T is the minimum will be included and the phase rotation angle $\phi_d$ due to a dispersion can be reduced. The fiber laser 101 whose $\phi_d$ is small can mode-lock even a pulse light with small power. Therefore, a broadband light source in which mode-locking of the resonator 107 is stabilized and damage of components is less likely to occur is realized. Note that a dashed line A in FIG. 5 represents the spectral width $\Delta\lambda\_3$ dB at which the change amount of the pulse width T is 3 dB when the spectral width is changed by 0.1 nm. A dashed line B in FIG. 5 represents the spectral width $\Delta\lambda\_min$ at which the pulse width T is the minimum. A dashed line C in FIG. 5 represents the spectral width $\Delta\lambda\_min \times 2$.

Figure 6:
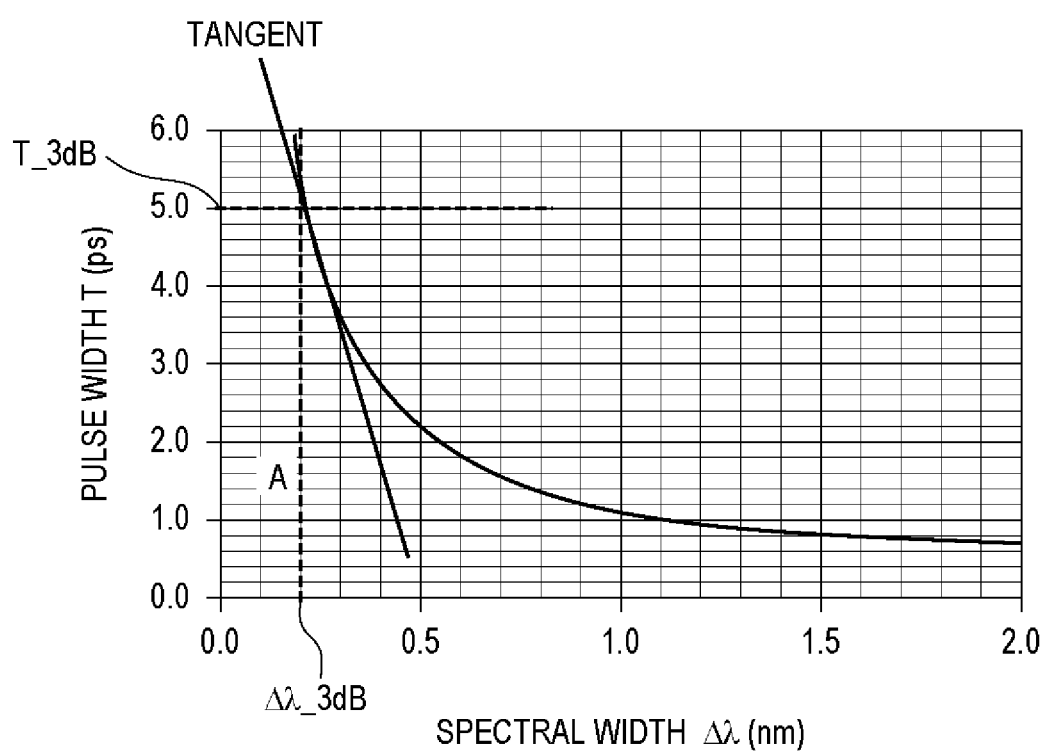
FIG. 6 is a graph illustrating a relationship of a spectral width $\Delta\lambda$ and a pulse width T according to the second embodiment.

FIG. 6 is an enlarged view around the spectral width $\Delta\lambda\_3$ dB in the graph of FIG. 5. The spectral width $\Delta\lambda\_3$ dB is 0.2 nm. The pulse width T_3 dB at the spectral width $\Delta\lambda\_3$ dB is 5 ps. The slope of a tangent $(dT/d\Delta\lambda)$ that has a point of tangency at the spectral width $\Delta\lambda\_3$ dB and the pulse width T_3 dB is approximately 25 (ps/nm). Further, the change amount of the pulse width when the spectral width is increased by $\delta\Delta\lambda$ equal to 0.1 nm is $(dT/d\Delta\lambda) \times \delta\Delta\lambda/T\_3$ dB$=-25$ (ps/nm)$\times 0.1$ (nm)/5 (ps)$=-0.5$. That is, the change amount of the pulse width T when the spectral width is increased by 0.1 nm at $\Delta\lambda\_3$ dB is $-3$ dB. Therefore, with the spectral width $\Delta\lambda$ of a pulse light output from the fiber laser 101 being greater than or equal to 0.2 nm, the absolute value of the change amount of the pulse width T will be less than or equal to 3 dB. At this time, the variation of the pulse width, that is, the variation of the peak power, which is caused by the variation of the spectral bandwidth of the bandpass filter 115, becomes substantially the same level as the transmission loss of the optical components such as the isolators 116 and 117. Therefore, the variation of the peak power is within a range where the variation of the peak power can be corrected by adjustment of the amplification factor of the optical fiber amplifier 102.

In the second embodiment, the spectral width $\Delta\lambda$ of the pulse light output from the fiber laser 101 is approximately 2.5 nm. That is, the spectral width $\Delta\lambda$ is narrower than twofold spectral width $\Delta\lambda\_{min}$ at which the pulse width T is the minimum and wider than the spectral width $\Delta\lambda\_3$ dB at which the change amount of the pulse width T when the spectral width $\Delta\lambda$ is increased by 0.1 nm is $-3$ dB. In other words, a relationship of $\Delta\lambda\_3 \text{ dB} \leq \Delta\lambda \leq \Delta\lambda\_{min} \times 2$ is satisfied.

Figure 7:
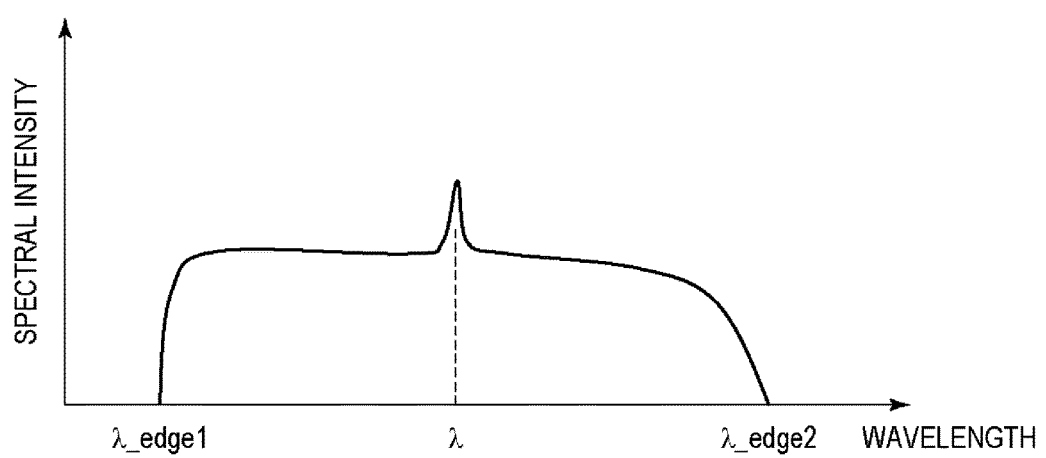
FIG. 7 is a graph illustrating a spectral intensity of an SC light output from the broadband light source according to the second embodiment.

As a result, in the broadband light source of the second embodiment, mode-locking of the fiber laser 101 is stable and damage of optical components is less likely to occur. Furthermore, in the broadband light source of the second embodiment, the variation of the peak intensity of the pulse width T due to the variation of the spectral width $\Delta\lambda$ can be suppressed within a range where the variation of the peak intensity can be corrected by the optical fiber amplifier 102. Further, in the second embodiment, the pulse width of an incident pulse light to the photonic crystal fiber 103 is sufficiently short. Therefore, the band of an SC light emitted from the photonic crystal fiber 103 has been sufficiently broadened. FIG. 7 is a graph illustrating the spectral intensity distribution of an SC light output from the broadband light source according to the second embodiment. In FIG. 7, $\lambda\_{edge1}$ is equal to 500 nm, $\lambda\_{edge2}$ is greater than 1600 nm, and the spectral intensity in a wavelength band from 500 nm to 700 nm is greater than or equal to 0.2 mW/nm. Therefore, the broadband light device according to the present embodiment has a good property as a light source of the visible light region.

As discussed above, according to the present embodiment, a light source device that can generate an SC light without using dispersion compensation optics is provided. This can reduce the problems such as an increase in size of the light source, complicated alignment of components, and instability of the light source due to misalignment that would otherwise be caused by the presence of dispersion compensation optics.

Note that, in the present embodiment, all the optical fibers and optical components included in the resonator 107 have a positive group delay dispersion. Since the group delay dispersion D1 is likely to be larger in such a configuration, the advantages of the present embodiment described above will be further effective. Further, in the present embodiment, all the optical fibers and optical components included in a light path between the output terminal of the resonator 107 and the input terminal of the photonic crystal fiber 103 also have a positive group delay dispersion. Since the group delay dispersion D2 is likely to be larger in such a configuration, the advantages of the present embodiment described above will be further effective.

Third Embodiment

Figure 8:
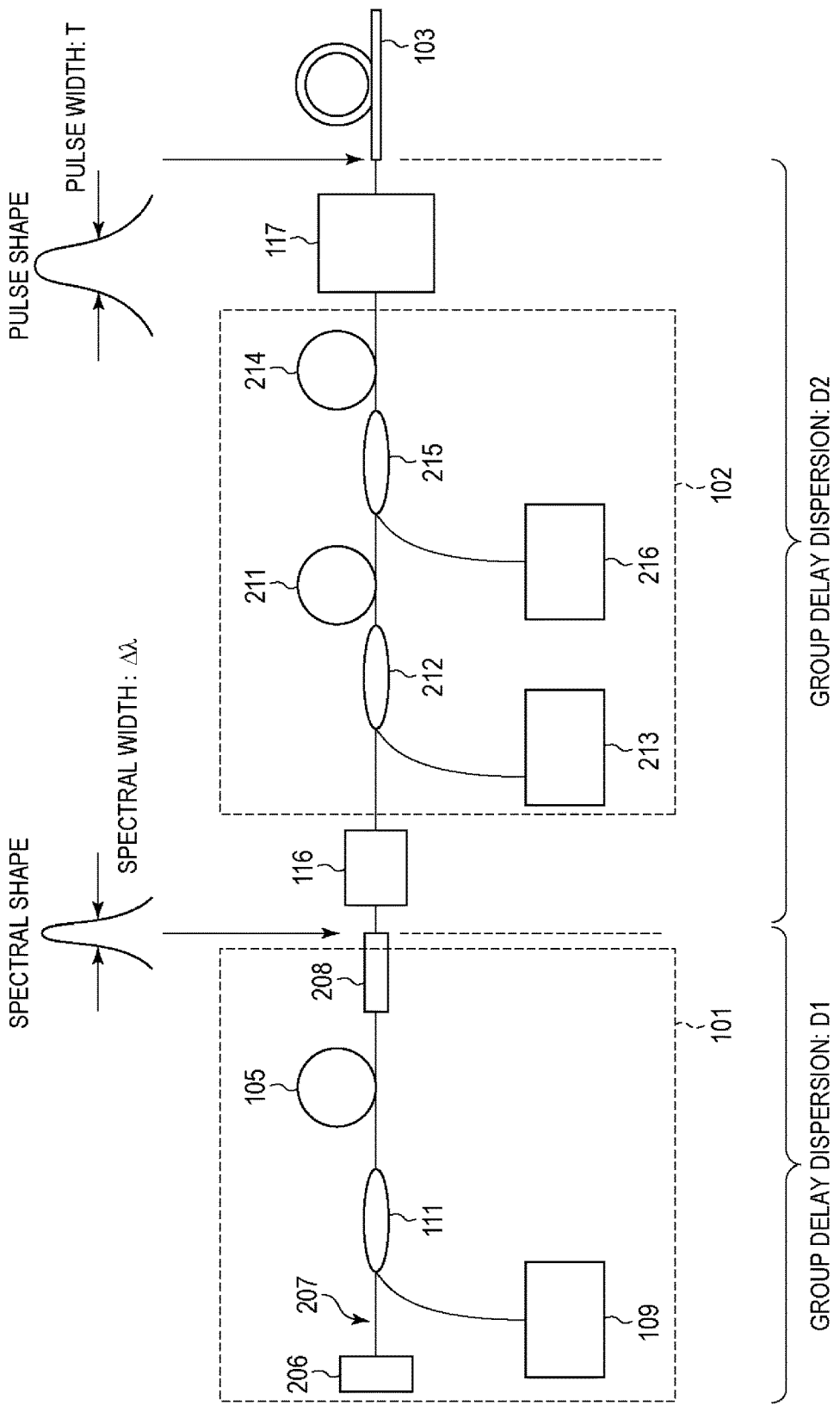
FIG. 8 is a configuration diagram of a broadband light source according to a third embodiment.

FIG. 8 is a configuration diagram of a broadband light source according to the third embodiment. The fiber laser 101 includes a resonator 207 and the light source 109. The resonator 207 includes a saturable absorber mirror 206, a fiber Bragg grating mirror (FBG mirror) 208, the input coupler 111, and the Yb-doped fiber 105. A region interposed between the saturable absorber mirror 206 and the FBG mirror 208 forms the resonator 207 of the fiber laser 101. The saturable absorber mirror 206 contains one or more of a semiconductor, a carbon nano-tube, and a graphene, for example, as a material, and functions as a saturable absorber with respect to a reflecting light. That is, the saturable absorber mirror 206 reflects a pulse light propagating in the resonator 207 at a low loss and provides a high loss to a reflecting light when the reflecting light is not a pulse light.

A pulse light propagating in the resonator 207 contains a light having any wavelength in a wavelength band from 1000 nm to 1100 nm. The FBG mirror 208 has a function of an output coupler and a function of an optical filter. The FBG mirror 208 extracts, from the resonator 207, 50% of the power of a pulse light which has propagated in the resonator 207 and reached the FBG as an output, and returns the remaining 50% of the power to the inside of the resonator 207. The center wavelength of the reflection spectral of the FBG mirror 208 substantially matches the center wavelength $\lambda$ of the pulse light propagating in the resonator 207. A light reflected by the FBG mirror 208 resonates in the resonator 207 and becomes a pulse light. Therefore, with a use of the FBG mirror 208 having a bandwidth of a desired reflection spectrum, the spectral width $\Delta\lambda$ of a pulse light can be controlled to a desired value. For example, a dielectric multilayer, a semiconductor multilayer, or the like may be used as the FBG mirror 208. The center wavelength of the reflection spectrum of the FBG mirror 208 may be 1030 nm, for example. The bandwidth of the reflection spectrum of the FBG mirror 208 may be 1.0 nm, for example. In this case, the center wavelength of the pulse light resonating within the resonator 207 is approximately 1030 nm and the spectral width is approximately 1.0 nm.

The light source 109 may be a laser diode, for example. The light source 109 outputs an excitation light whose wavelength matches an absorption wavelength of the Yb-doped fiber 105. The wavelength of the excitation light output from the light source 109 may be 980 nm, for example. The excitation light enters the resonator 207 through the input coupler 111. The excitation light entering the resonator 207 excites the Yb-doped fiber 105. The excited Yb-doped fiber provides optical energy to a pulse light propagating in the resonator 207 by a stimulated emission process. These optical components of the resonator 207 are connected by single-mode fibers that exhibit the single mode for the wavelength $\lambda$ of a pulse light. For example, Corning part No. HI1060 may be used for this single-mode fiber.

A sum of the length of the single-mode fiber connected between the FBG mirror 208 and the saturable absorber mirror 206 and the length of the Yb-doped fiber 105 is approximately 3 m. Therefore, the propagation distance where a pulse light circulates completely through the resonator 207, that is, the length of one round in the resonator 207 is approximately 6 m. The fiber laser 101 in the configuration described above outputs a pulse light whose center wavelength $\lambda$ is 1030 nm, spectral width $\Delta\lambda$ is 1.0 nm, repetition frequency f is 30 MHz, and output power is approximately 3 mW. The pulse light output from the fiber laser 101 is mode-locked and the repetition frequency f thereof is substantially inversely proportional to the reciprocal number of the time for the pulse light to circulate completely through the resonator 207. The group delay dispersion of the resonator 207 is a sum of the group delay dispersions of optical components and optical fibers included in the resonator 207. The group delay dispersions of the saturable absorber mirror 206 and the input coupler 111 included in the resonator 207 are sufficiently smaller than the group delay dispersions of the Yb-doped fiber 105 and the optical fibers connected between the optical components. Thus, when the group delay dispersion of the FBG mirror 208 is negligibly small, the group delay dispersion D1 of the resonator 207 is substantially determined by the group delay dispersion of the optical fibers. The average value of the group velocity dispersions of the optical fibers of the resonator 207 is 0.025 (ps$^2$/m). The group delay dispersion D1 obtained by multiplying this average value by 6 m, which is the length of the resonator 207, is 0.15 (ps$^2$).

Further, the group delay dispersion of the FBG mirror 208 of the resonator 207 may have a negative value. For example, the group delay dispersion of the FBG mirror 208 may be a value around −0.05 (fs$^2$). In this case, the group delay dispersion D1 of the resonator 207 will be 0.10 (ps$^2$). Furthermore, the group delay dispersion of the FBG mirror 208 of the resonator 207 may have a positive value. For example, the group delay dispersion of the FBG mirror 208 may be a value around +0.05 (fs$^2$). In this case, the group delay dispersion D1 of the resonator 207 will be 0.20 (ps$^2$).

The optical fiber amplifier 102 has a two-stage amplifier. The optical fiber amplifier 102 has two Yb-doped fibers 211 and 214, two couplers 212 and 215, and two light sources 213 and 216. The Yb-doped fiber 211, the coupler 212, and the light source 213 form the first-stage amplifier, and the Yb-doped fiber 214, the coupler 215, and the light source 216 form the second-stage amplifier. Note that, while a configuration with a two-stage amplifier is exemplified in the present embodiment, a one-stage amplifier may be provided in a similar manner to the second embodiment, or a two- or more-stage amplifier, that is, a multistage amplifier may be provided. Since the group delay dispersion D2 is likely to be large when the number of stages of amplifier is more than one, the advantages of the present embodiment will be further effective.

The Yb-doped fiber 211 is a single-mode fiber having a length of 1 m, and the Yb-doped fiber 214 is a double-clad fiber having a length of 3 m. Each of the light sources 213 and 216 outputs an excitation light of 980 nm that is an absorption wavelength of the Yb-doped fibers 211 and 214. Each of the couplers 212 and 215 is a wavelength division multiplexing coupler. Two input terminals of the coupler 212 are connected to a fiber which is the output terminal of the light source 213 and to a fiber which propagates a pulse light output from the fiber laser 101, respectively. Two input terminals of the coupler 215 are connected to a fiber that is the output terminal of the light source 216 and to the Yb-doped fiber 211, respectively. The excitation lights are propagated to the Yb-doped fibers 211 and 214 via the couplers 212 and 215, respectively, to excite the Yb-doped fibers 211 and 214.

The photonic crystal fiber 103 has an anomalous dispersion at the center wavelength λ of a pulse light. When λ is 1030 nm, for example, NKT Photonics part No. SC-3.7-975 whose zero dispersion wavelength is 975 nm may be used for the photonic crystal fiber 103. The length of the photonic crystal fiber 103 can be selected from a range from 1 m to 3 m, for example.

The fiber laser 101 and the optical fiber amplifier 102 are connected by an optical fiber via the isolator 116. The optical fiber amplifier 102 and the photonic crystal fiber 103 are connected by an optical fiber via the isolator 117. The pulse light output from the fiber laser 101 is amplified by the optical fiber amplifier 102 and reaches the input terminal of the photonic crystal fiber 103. The pulse light that has reached the photonic crystal fiber 103 has been amplified in power to approximately 3 W. The length from the output terminal of the resonator 207 (that is, the output terminal of the FBG mirror 208) to the input terminal of the photonic crystal fiber 103 is approximately 7 m. The group delay dispersion D2 from the output terminal of the fiber laser 101 to the input terminal of the photonic crystal fiber 103 is a sum of the group delay dispersions of optical components and optical fibers connected between the output terminal of the fiber laser 101 to the input terminal of the photonic crystal fiber 103. The group delay dispersions of the isolators 116 and 117 and the couplers 212 and 215 that are optical components are much smaller than the group delay dispersions of the Yb-doped fibers 211 and 214 and the optical fibers connected between the optical components. Therefore, the group delay dispersion D2 is substantially determined by the group delay dispersions of the optical fibers. The average value of the group velocity dispersions of the optical fibers from the output terminal of the fiber laser 101 to the input terminal of the photonic crystal fiber 103 is 0.025 (ps$^2$/m), and the group delay dispersion D2 obtained by multiplying this average value by 7 m, which is the length of the fibers, is approximately 0.175 (ps$^2$).

Figure 9:
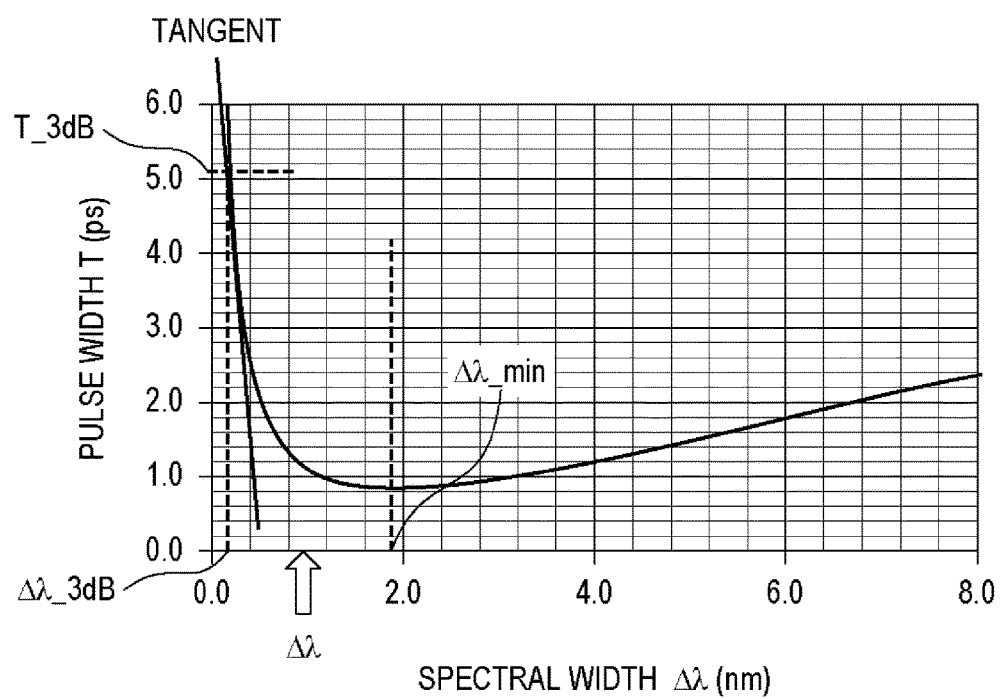
FIG. 9 is a graph illustrating a relationship of a spectral width Δλ and a pulse width T according to the third embodiment.

FIG. 9 is a graph illustrating a relationship of the pulse width T and the spectral width Δλ. The pulse width T becomes a local minimum and the minimum at the spectral width of 1.9 nm (equal to Δλ_min). Therefore, with the spectral width Δλ being less than or equal to 3.8 nm, the spectral width close to Δλ_min at which the pulse width T is the minimum is included and the phase rotation angle ϕ$_d$ due to a dispersion can be reduced. The fiber laser 101 whose ϕ$_d$ is small can mode-lock even a pulse light with small power. Therefore, a broadband light source in which mode-locking is stabilized and damage of components is less likely to occur is realized. Note that a dashed line A in FIG. 9 represents the spectral width Δλ_3 dB at which the change amount of the pulse width T is −3 dB when the spectral width is increased by 0.1 nm.

The spectral width Δλ_3 dB is 0.2 nm. The pulse width T_3 dB at the spectral width of Δλ_3 dB is 5 ps. The slope of a tangent (dT/dΔλ) that has a point of tangency at the spectral width Δλ_3 dB and the pulse width T_3 dB is approximately −25 (ps/nm). The change amount of the pulse width when the spectral width is changed by δΔλ that is equal to 0.1 nm is (dT/dΔλ)× δΔλ/T_3 dB=−25 (ps/nm)×0.1 (nm)/5 (ps)=−0.5. That is, the change amount of the pulse width T when the spectral width is increased by 0.1 nm at Δλ_3 dB is −3 dB. Therefore, with the spectral width Δλ of a pulse light output from the fiber laser 101 being greater than or equal to 0.2 nm, the absolute value of the change amount of the pulse width T is less than or equal to 3 dB. In this case, the variation of the pulse width, that is, the variation of the peak power, which is caused by the variation of the spectral bandwidth of the FBG mirror 208, becomes substantially the same level as the transmission loss of other optical components such as the isolators 116 and 117. Therefore, the variation of the peak power is suppressed within a range where the variation of the bandwidth of the FBG mirror can be corrected by adjustment of the amplification factor of the optical fiber amplifier 102.

The output power P$_{out}$ of a pulse light output from the fiber laser 101 is 3 mW, the repetition frequency f is 30 MHz, and the center wavelength λ is 1030 nm. In this case, the average value $P_{peak}$ of the peak intensity of a pulse light within the resonator 207 is approximately estimated by the following equation.

$$P_{peak} = \frac{0.88 P_{out}}{\kappa f \frac{0.315}{\left(\frac{c}{\lambda^2}\Delta\lambda\right)}} \quad (8)$$

Further, the phase rotation angle $\phi_{SPM}$ of the pulse light due to self-phase modulation is expressed by the following equation:

$$\phi_{SPM} = \gamma P_{peak} L \quad (9)$$

$$= \gamma \frac{0.88 P_{out}}{\kappa f \frac{0.315}{\left(\frac{c}{\lambda^2}\Delta\lambda\right)}} L$$

$$= \gamma \frac{0.88 P_{out}}{0.315 \kappa f} \left(\frac{c}{\lambda^2}\Delta\lambda\right) L$$

where κ represents the extraction efficiency of a pulse light from the resonator 207 and γ represents the average value of nonlinear coefficients of the resonator 207. The extraction efficiency of the pulse light from the resonator 207 is substantially equal to the transmission rate of the FBG mirror 208, and the value κ is approximately 0.5 (50%). The average value of the nonlinear coefficient γ of the resonator 207 is approximately 2.0 ($W^{-1}$/km).

Figure 10:
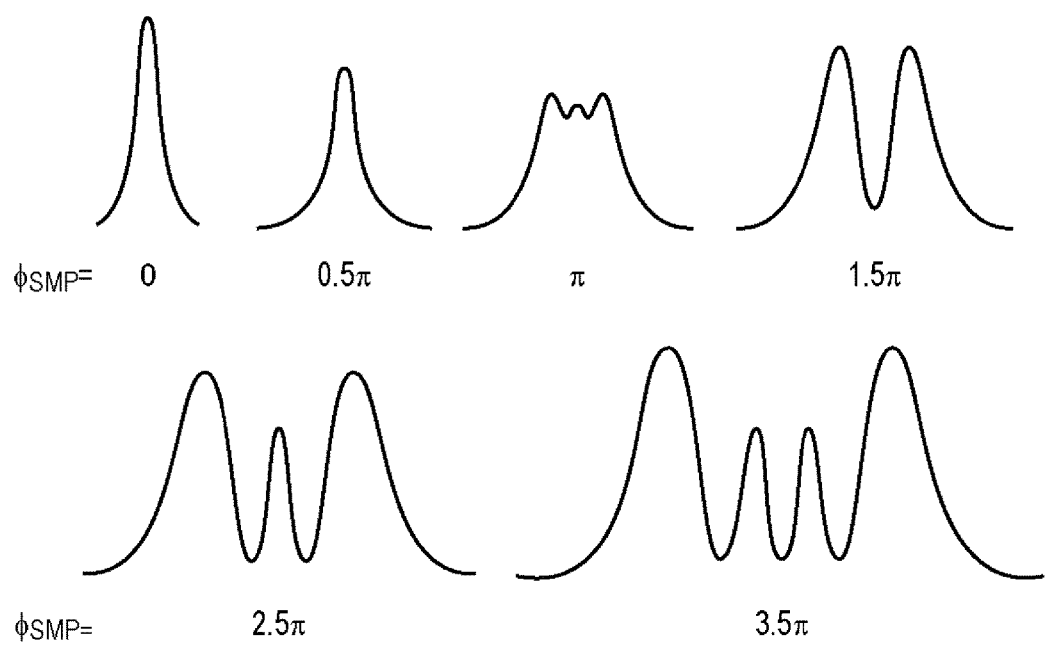
FIG. 10 is a diagram illustrating spectral distortions due to self-phase modulation.

FIG. 10 illustrates changes of the spectral distortion of a pulse light when the phase rotation angle $\phi_{SPM}$ of the pulse light due to self-phase modulation is changed with $\phi_{SPM}$=0, 0.5π, π, 1.5π, 2.5π, and 3.5π (radian). Note that π is the circular constant. A larger phase rotation angle $\phi_{SPM}$ results in a larger spectral distortion. As indicated by Equation (9), since the phase rotation angle $\phi_{SPM}$ is proportional to the spectral width Δλ, a larger spectral width Δλ results in a larger spectral distortion. When the phase rotation angle $\phi_{SPM}$ is large and thus the spectral distortion is large, a pulse light propagating in the resonator 207 is likely to be unstable. In particular, as illustrated in FIG. 10, the phase rotation angle $\phi_{SPM}$ exceeding π leads to a notable spectral distortion. It is therefore desirable that the phase rotation angle $\phi_{SPM}$ due to self-phase modulation be smaller than π (radian) (approximately equal to 3.14 (radian)) where the spectral distortion becomes large.

The spectral width Δλ of a pulse light output from the fiber laser 101 is 1 nm that is substantially equal to the bandwidth of the FBG mirror 208. In this case, the phase rotation angle $\phi_{SPM}$ due to self-phase modulation is 1.9 (radian) that is less than π (radian).

The spectral width Δλ of a pulse light output from the fiber laser is 1 nm that is substantially equal to the bandwidth of the FBG mirror 208. That is, Δλ is narrower than the spectral width Δλ_min at which the pulse width T is the minimum. Therefore, in the third embodiment, mode-locking of the fiber laser 101 is more stable and damage of the components is less likely to occur than in the second embodiment. Further, the spectral width Δλ is wider than the spectral width Δλ_3 dB (equal to 0.2 nm) at which the change amount of the pulse width T when the spectral width Δλ changes by 0.1 nm is 3 dB. As a result, in addition to the advantages described above, the broadband light source of the third embodiment has an advantage that the variation of the peak intensity of a pulse light due to the variation of the spectral width Δλ can be suppressed within a range where the variation of the peak intensity can be corrected by the optical fiber amplifier 102.

Furthermore, the phase rotation angle $\phi_{SPM}$ (equal to 1.9 (radian)) due to self-phase modulation in the third embodiment is smaller than π (radian) (approximately equal to 3.14 (radian)) where the spectral distortion becomes notable. Thus, the stability of a pulse light propagating in the resonator 207 is further improved.

When the output power $P_{out}$ is 3 mW, the repetition frequency f is 30 MHz, the center wavelength λ is 1030 nm, the nonlinear coefficient γ is 2.0 ($W^{-1}$/km), and the resonator length L is 6 m, Equation (9) indicates that, with the spectral width Δλ being less than or equal to 1.8 nm, the phase rotation angle $\phi_{SPM}$ due to self-phase modulation will be less than or equal to π (radian). Therefore, with the spectral width Δλ of a pulse light output from the fiber laser 101 being in a range from 0.2 nm to 1.8 nm, the stability of a pulse light propagating in the resonator 207 is further improved and thus operation of the broadband light source can be further stabilized.

In the SC light output from the broadband light source according to the third embodiment, λ_edge1 is equal to 480 nm, λ_edge2 is greater than 1800 nm, and the spectral intensity in a wavelength band from 500 nm to 700 nm is greater than or equal to 0.3 mW/nm. Therefore, the light source device according to the present embodiment has a good property as a light source of the visible light region.

As discussed above, according to the present embodiment, a light source device that can generate an SC light without using dispersion compensation optics is provided. This can reduce the problems such as an increase in size of the light source, complicated alignment of components, and instability of the light source due to misalignment that would otherwise be caused by the presence of dispersion compensation optics.

Note that, in the present embodiment, all the optical fibers and optical components included in the resonator 207 have a positive group delay dispersion. Since the group delay dispersion D1 is likely to be larger in such a configuration, the advantages of the present embodiment described above will be further effective. Further, in the present embodiment, all the optical fibers and optical components included in a light path between the output terminal of the resonator 207 and the input terminal of the photonic crystal fiber 103 also have a positive group delay dispersion. Since the group delay dispersion D2 is likely to be larger in such a configuration, the advantages of the present embodiment described above will be further effective.

Fourth Embodiment

As the fourth embodiment, an information acquisition apparatus using the light source device according to any of the first to third embodiments will be described with reference to FIG. 12. The information acquisition apparatus of the present embodiment is a spectrally encoded endoscopy (hereafter, referred to as SEE) as an example. The information acquisition apparatus has a light source device 1201, a wavelength filter 1202, optical waveguides 1203 and 1208, a spectroscope 1204, an optical divider 1207, a detector 1209, and a computer 1210.

The light source devices described in the first to third embodiments may be used for the light source device 1201. The light source device 1201 outputs an SC light having a spectral band of wavelengths of 480 to 1800 nm. The output SC light is filtered by the wavelength filter 1202 into a desired spectral band. The spectral band of the light output from the wavelength filter 1202 is wavelengths of 480 to 780 nm, for example.

The light filtered by the wavelength filter 1202 passes through the optical divider 1207, propagates in the optical waveguide 1203, and enters the spectroscope 1204. The spectroscope 1204 is a head of an SEE incorporating a dispersion element therein and has a function of diffracting a light from the light source device 1201 to irradiate a measuring object 1206. The light entering the spectroscope 1204 becomes irradiation lights 1205 irradiated in different directions for respective wavelengths. A grating, a prism, or the like may be used for the dispersion element. The measuring object 1206 is irradiated with the irradiation light 1205, and a reflected light and a backscattered light return to the spectroscope 1204 and are recombined. The recombined light again propagates in the optical waveguide 1203, passes through the optical divider 1207, and propagates to the optical waveguide 1208. The light that has propagated in the optical waveguide 1208 is detected by the detector 1209.

The detector 1209 is a device that has a function of detecting a light containing information of the measuring object. The detector 1209 may be an optical spectrum analyzer or may be a spectrum detection element that is a combination of a line sensor and a dispersion element. A signal detected by the detector 1209 is imaged and displayed by the computer 1210. Two-dimensional data of the measuring object 1206 can be acquired by rotating or moving the spectroscopy 1204. According to the present embodiment, an information acquisition apparatus such as an SEE with the light source device 1201 of any of the first to third embodiments is provided.

Other Embodiments

The present invention is not limited to the embodiments described above, and various modification can be made without departing from the spirit of the present invention. For example, modification with any combination of the configurations illustrated in the first to fourth embodiments described above may be applied.

According to the embodiments described above, a light source device that can generate an SC light without using dispersion compensation optics is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-240266, filed Dec. 9, 2015, which is hereby incorporated by reference herein in its entirety.

What is claimed is:

1. A light source device comprising:
a fiber laser including a resonator that generates a pulse light;
an amplifier that amplifies the pulse light emitted from the fiber laser and emits the amplified pulse light; and
a nonlinear fiber that generates a nonlinear effect when the pulse light amplified by the amplifier passes through the nonlinear fiber,
wherein a group delay dispersion of the resonator is denoted as D1, a group delay dispersion between an output terminal of the resonator and an input terminal of the nonlinear fiber is denoted as D2, and each of the group delay dispersion D1 and the group delay dispersion D2 is a positive value,
the velocity of light in a vacuum is denoted as c, a spectral full width at half maximum of the pulse light emitted from the fiber laser is denoted as $\Delta\lambda$, the center wavelength of the pulse light emitted from the fiber laser is denoted as $\lambda$, and a coefficient based on a shape of the pulse light is denoted as a,
a value of the spectral full width at half maximum $\Delta\lambda$ at which a function $T(\Delta\lambda)$:

$$T(\Delta\lambda) = \left(\frac{a \times \lambda^2}{c \times \Delta\lambda}\right)\sqrt{1 + \left[(D1 + D2)\left(\frac{c \times \Delta\lambda}{a \times \lambda^2}\right)^2\right]^2} \quad (1)$$

is the minimum is denoted as $\Delta\lambda\_\text{min}$, and
a value of the spectral full width at half maximum $\Delta\lambda$ at which a change amount of the function $T(\Delta\lambda)$ when the spectral full width at half maximum $\Delta\lambda$ increases by 0.01% of the center wavelength $\lambda$ becomes $-3$ dB is denoted as $\Delta\lambda\_3$ dB, and
wherein the spectral full width at half maximum $\Delta\lambda$ satisfies $\Delta\lambda\_3$ dB$\leq \Delta\lambda \leq \Delta\lambda\_\text{min} \times 2$.

2. The light source device according to claim 1, wherein a pulse full width at half maximum of the pulse light emitted from the fiber laser is represented by the function $T(\Delta\lambda)$.

3. The light source device according to claim 1, wherein the resonator includes a saturable absorber that selectively transmits a pulse light.

4. The light source device according to claim 1, wherein the resonator includes a saturable absorber that selectively reflects a pulse light.

5. The light source device according to claim 1, wherein the resonator includes an optical filter that controls the spectral full width at half maximum $\Delta\lambda$ of the pulse light.

6. The light source device according to claim 1, wherein the nonlinear fiber has an anomalous dispersion at the center wavelength $\lambda$.

7. The light source device according to claim 1, wherein an equation:

$$\gamma \frac{0.88 P_{out}}{a \times \kappa \times f}\left(\frac{c}{\lambda^2}\Delta\lambda\right)L < \pi \quad (2)$$

is satisfied, where $\kappa$ represents an extraction efficiency of a pulse light from the resonator, f represents a pulse repetition frequency of the pulse light emitted from the fiber laser, L represents a length of the resonator, $\gamma$ represents an average value of nonlinear coefficients of the resonator, $\pi$ represents the circular constant, and $P_{out}$ represents power of the pulse light emitted from the fiber laser.

8. The light source device according to claim 1, wherein the spectral full width at half maximum $\Delta\lambda$, satisfies $\Delta\lambda\_3$ dB$\leq \Delta\lambda \leq \Delta\lambda\_\text{min}$.

9. The light source device according to claim 1, wherein all optical fibers and optical components included in the resonator have a positive group delay dispersion.

10. The light source device according to claim 1, wherein all optical fibers and optical components included in a optical path between the output terminal of the resonator and the input terminal of the nonlinear fiber have a positive group delay dispersion.

11. The light source device according to claim 1, wherein the amplifier includes a multistage amplifier.

12. The light source device according to claim 1, wherein a light emitted from the nonlinear fiber has a spectral intensity that is greater than or equal to 0.2 mW/nm in a wavelength band from 500 nm to 700 nm.

13. The light source device according to claim 1, wherein the pulse light has a sech$^2$ shape, and the coefficient a based on the shape of the pulse light is 0.315.

14. The light source device according to claim 1, wherein the pulse light has a Gaussian shape, and the coefficient a based on the shape of the pulse light is 0.441.

15. A light source device comprising:
a fiber laser including a resonator that generates a pulse light;
an amplifier that amplifies the pulse light emitted from the fiber laser and emits the amplified pulse light; and
a nonlinear fiber that generates a nonlinear effect when the pulse light amplified by the amplifier passes through the nonlinear fiber,
wherein a group delay dispersion of the resonator is denoted as D1, a group delay dispersion between an output terminal of the resonator and an input terminal of the nonlinear fiber is denoted as D2, and each of the group delay dispersion D1 and the group delay dispersion D2 is a positive value, and
wherein the light source device is configured to generate a supercontinuum light without using dispersion compensation optics.

16. An information acquisition apparatus comprising:
a light source device including
a fiber laser including a resonator that generates a pulse light;
an amplifier that amplifies the pulse light emitted from the fiber laser and emits the amplified pulse light; and
a nonlinear fiber that generates a nonlinear effect when the pulse light amplified by the amplifier passes through the nonlinear fiber;
wherein a group delay dispersion of the resonator is denoted as D1, a group delay dispersion between an output terminal of the resonator and an input terminal of the nonlinear fiber is denoted as D2, and each of the group delay dispersion D1 and the group delay dispersion D2 is a positive value,
the velocity of light in a vacuum is denoted as c, a spectral full width at half maximum of the pulse light emitted from the fiber laser is denoted as $\Delta\lambda$, the center wavelength of the pulse light emitted from the fiber laser is denoted as $\lambda$, and a coefficient based on a shape of the pulse light is denoted as a,
a value of the spectral full width at half maximum $\Delta\lambda$ at which a function $T(\Delta\lambda)$:

$$T(\Delta\lambda) = \left(\frac{a \times \lambda^2}{c \times \Delta\lambda}\right)\sqrt{1 + \left[(D1 + D2)\left(\frac{c \times \Delta\lambda}{a \times \lambda^2}\right)^2\right]^2} \quad (1)$$

is the minimum is denoted as $\Delta\lambda\_min$, and
a value of the spectral full width at half maximum $\Delta\lambda$ at which a change amount of the function $T(\Delta\lambda)$ when the spectral full width at half maximum $\Delta\lambda$ increases by 0.01% of the center wavelength $\lambda$ becomes $-3$ dB is denoted as $\Delta\lambda\_3$ dB, and
wherein the spectral full width at half maximum $\Delta\lambda$ satisfies $\Delta\lambda\_3$ dB$\leq\Delta\lambda\leq\Delta\lambda\_min\times 2$,
a spectroscope that diffracts a light from the light source device to irradiate a measuring object; and
a detector that detects a light containing information of the measuring object.

* * * * *